US012382964B2

(12) United States Patent
Brown

(10) Patent No.: US 12,382,964 B2
(45) Date of Patent: Aug. 12, 2025

(54) LEAVENING AGENT

(71) Applicant: Kudos Blends Ltd., Cleobury Mortimer (GB)

(72) Inventor: Daniel James Brown, Bewdley (GB)

(73) Assignee: Kudos Blends Ltd., Worcestershire (GB)

( * ) Notice: Subject to any disclaimer, the term of this patent is extended or adjusted under 35 U.S.C. 154(b) by 0 days.

(21) Appl. No.: 16/312,175

(22) PCT Filed: Jun. 22, 2017

(86) PCT No.: PCT/GB2017/051831
§ 371 (c)(1),
(2) Date: Dec. 20, 2018

(87) PCT Pub. No.: WO2017/221018
PCT Pub. Date: Dec. 28, 2017

(65) Prior Publication Data
US 2019/0223455 A1    Jul. 25, 2019

(30) Foreign Application Priority Data

Jun. 23, 2016 (GB) ....................... 1610976
Aug. 3, 2016 (GB) ....................... 1613385
Dec. 8, 2016 (GB) ....................... 1620894
Apr. 21, 2017 (GB) ....................... 1706373

(51) Int. Cl.
*A21D 10/00* (2006.01)
*A21D 2/02* (2006.01)
*A21D 2/14* (2006.01)

(52) U.S. Cl.
CPC ............... *A21D 2/02* (2013.01); *A21D 2/145* (2013.01); *A21D 10/005* (2013.01)

(58) Field of Classification Search
None
See application file for complete search history.

(56) References Cited

U.S. PATENT DOCUMENTS

| 3,653,917 A | 4/1972 | Wahba et al. |
| 4,388,336 A * | 6/1983 | Yong ............... A21D 10/025 426/128 |
| 5,882,712 A | 3/1999 | Wu |
| 2015/0132437 A1 | 5/2015 | Abdelrahman |

FOREIGN PATENT DOCUMENTS

| CA | 2870317 | * 11/2013 |
| GB | 252695 A | 1/1927 |

OTHER PUBLICATIONS

International Search Report and Written Opinion of the International Searching Authority dated Aug. 28, 2017 for Intl. Appln. PCT/GB2017/051831, 16 pgs.
Komprda, Tomas et al., "A combination of additives can synergically decrease acrylamide content in gingerbread without compromising sensory quality," Journal of the Science of Food and Agriculture, vol. 97, No. 3, Jun. 14, 2016, pp. 889-895, XP055398919, ISSN:0022-5142, DOI:10.1002/jsfa.7811.

* cited by examiner

Primary Examiner — Lien T Tran
(74) Attorney, Agent, or Firm — Boardman & Clark LLP

(57) ABSTRACT

A leavening composition which gives an enhanced leavening and reduced use of acidulants comprises (1) an alkali metal bicarbonate; (2) at least 0.1 and preferably at least 1 mole per mole of bicarbonate of a precipitant which is a water-soluble alkaline earth metal salt; and (3) optionally an acidulant; wherein (2) and (3) are present in a total amount from 105 to 800% of the stoichiometric amount that would be required to react fully with (1) in a boiling aqueous solution.

In a preferred embodiment the acidulant forms a water insoluble calcium or magnesium salt and is sufficient to provide more than 0.105 g replaceable hydrogen per 100 mmol bicarbonate, and the precipitant is a water soluble calcium or magnesium salt which is capable of precipitating or complexing with said acidulant and is present in an amount sufficient to provide a final pH below 6.5 when the leavening agent is heated in a bakery mix, which allows the inclusion of an effective amount of a preservative.

10 Claims, No Drawings

LEAVENING AGENT

This application claims priority as a national stage application of International Application No. PCT/GB2017/051831 which has an international filing date of Jun. 22, 2017, and which claims priority to foreign applications No. GB1610976.1 filed Jun. 23, 2016, No. GB1613385.2 filed Aug. 3, 2016, GB1620894.4 filed Dec. 8, 2016 and GB1706373.6 filed Apr. 21, 2017, the contents of each of which is hereby incorporated herein by reference in its entirety.

The present invention relates to a leavening agent suitable for use in baking.

DEFINITIONS

As used herein the following terms shall have the meanings ascribed below:

"Acidulant" shall mean an acid or acid salt, having Replaceable Hydrogen, which is permitted for food use under prevailing regulations at the time of use;

"Baking" shall mean any method of treating a leavenable product which involves heating the product to a temperature above 60° C., so as to form a crumb, including oven baking, microwaving, frying and grilling.

"GDL" shall mean glucono-delta-lactone.

"MSC" shall mean mono sodium citrate;

"MCPa" shall mean anhydrous mono calcium phosphate;

"MCP m" shall mean mono calcium phosphate monohydrate;

"Neutralising Value" is the standard measure for assessing the effectiveness of Acidulants in the bakery industry. It may be determined as described on page 49 of the standard reference work "Chemical Leavening Agents" by Brose, Becker and Bouchain published in New York by Chemische Fabrik Budenheim (1996) referring to the method of "Laboratoriumsbuch fur den Lebensmittelchemiker" by Adolph Beythien and W Diemair published by Verlag Gisela Liedl; 8. Munchen Aflage (1971)—8$^{th}$ Munich edition, Page: 11-17;

"Non-acidic" shall mean having a Neutralising Value less than 2;

"Precipitating Cations" shall mean alkaline earth metal cations that precipitate carbonate, and/or precipitate or complex with the Acidulant when heated in a bakery mix;

"Precipitant" shall mean a water soluble salt of Precipitating Cations permitted for food use under prevailing regulations at the time of use;

"Precipitating Acidulant" shall mean an Acidulant which is a partially neutralised salt of Precipitating Cations and a di- or polyvalent acid;

"Replaceable Hydrogen" shall mean hydrogen having a pKa between 3 and 14, when in aqueous solution;

"SALP" shall mean sodium aluminium phosphate;

"SAPP" shall mean sodium acid pyrophosphate.

"Water Soluble" shall mean having a water solubility greater than 3% by weight at 20° C. and preferably greater than 5%.

The Problem

Chemical leavening agents conventionally comprise an alkali metal bicarbonate and an Acidulant, which reacts with the bicarbonate in an acid/base reaction to release carbon dioxide,

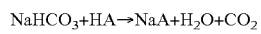

where HA is an acid having at least one replaceable hydrogen.

Many of the cheaper acids, such as the stronger mineral or carboxylic acids, e.g. hydrochloric, acetic or citric acid, are too active to be used as Acidulants in industrial bakery applications, as they react too vigorously with the bicarbonate at room temperature, releasing too much of the carbon dioxide prior to baking.

To avoid premature or excessively rapid release of carbon dioxide it has proved necessary to use more expensive acids such as sodium acid pyrophosphate, which can leave an unpleasant aftertaste when used in high levels, sodium aluminium phosphate, which is subject to health concerns, or the even more expensive glucono-delta-lactone. Currently by far the most commonly used Acidulant is SAPP. The Acidulant contributes a substantial part of the cost of a normal baking powder.

We have now discovered that, even with these Acidulants, relatively little of the carbon dioxide available in theory is released at the critical stage in baking when the crumb structure is forming, which starts around the gelatinisation temperature of starch between 60 and 70° C. Before this stage the mix is too mobile to retain most of the evolved gas, whereas beyond it the solidification of the mixture immobilises the reacting species and prevents the reaction from going to completion.

If the pH of the product is too high, e.g. above 8 there are problems with discolouration and the development of off flavours. These are particularly severe with sweetened products such as cakes. This may result from using a stoichiometric deficiency of Acidulant.

A major problem in commercial bakery is extending the shelf life of baked products. This may be achieved by lowering the water activity, but additives used for this purpose, such as salt or calcium phosphate all have substantial drawbacks when added in sufficient amounts to produce a useful effect. The alternative is to use a preservative.

The only effective preservatives suitable for food use need acid conditions. They are largely ineffective at any pH above 6.5, and generally require a pH value of about 6, or even lower, to be fully effective. To achieve such low values using the weak acids which are all that can be tolerated in baking powder would be difficult or impossible. In practice the result is an expensive and unsatisfactory compromise achieving a barely adequate pH with a large excess of expensive Acidulant, and often amounts of preservative in excess of those usually recommended, which many consumers find objectionable.

Excess Acidulant also causes premature release of carbon dioxide and reduced leavening. Formulators of leavening systems have always striven to get as close as possible to the stoichiometric ratio of Acidulant to bicarbonate. Too much bicarbonate gives an alkaline product with dark crumb and off-flavours. Too much Acidulant wastes an expensive ingredient and reduces the leavening effect.

Chemical leavening agents have hitherto found little application in bread. One reason has been the distinctive pyrophosphate flavour obtained using SAPP. A chemical leavening system suitable for use in bread would have substantial commercial benefits arising from the elimination of the proving stage, which would significantly speed up the manufacture.

All the foregoing problems have existed since chemical leavening agents were first invented, over a hundred and fifty years ago. It has been accepted in the industry that they are inherent features of the system. We have now discovered that this is not the case.

OBJECT OF THE INVENTION

An object of the invention is to use the ingredients of a leavening system more efficiently.

A further object is to avoid the use of Acidulant, or to reduce the amount of Acidulant required for a given increase in the volume of the product and/or to achieve a given lowering of pH.

A further object is to permit the use of cheaper Acidulants to obtain results that have hitherto required more expensive systems.

A further object is to permit the use as Acidulants of compounds that do not ordinarily react with bicarbonate.

A further object is to avoid or reduce the use of phosphates in baking powder.

A further object is to avoid or reduce the use of aluminium in baking powder.

A further object is to reduce salt levels in baked products.

A further object is to improve the shelf life of baked products.

A further object is to reduce water activity, without adding salt or calcium phosphate.

A further object of the invention is to provide products with a pH sufficiently low to allow the effective use of preservatives, using Acidulants acceptable in bakery.

A further object of the invention is to reduce the amount of Acidulant required to allow the effective use of preservatives.

THE DISCOVERY

It has long been known that it is possible to obtain a leavening effect without an Acidulant, using heat alone to decompose the bicarbonate:

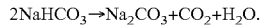

$$2NaHCO_3 \rightarrow Na_2CO_3 + CO_2 + H_2O.$$

In aqueous solution the reaction is an equilibrium. The high solubility of carbon dioxide at ambient temperature maintains the balance to the left, but the low solubility at elevated temperature allows it to proceed to the right. However this reaction only releases half the available carbon dioxide. The remainder is retained as alkali metal carbonate, which is too alkaline to be acceptable in most products, since the high pH is associated with unpleasant flavours and darkening of the crumb.

The present invention arose from an unsuccessful attempt to eliminate the use of Acidulants altogether, replacing the conventional acid/base reaction with an ion exchange reaction. We considered the possibility that a cheaper alternative to using Acidulants would be to add a Precipitant such as calcium chloride. In aqueous solution this should precipitate the carbonate formed in the above thermally driven disproportionation as calcium carbonate and leave a substantially non-alkaline solution of sodium chloride:

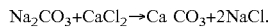

$$Na_2CO_3 + CaCl_2 \rightarrow CaCO_3 + 2NaCl.$$

Such a system would require double the amount of bicarbonate to release the same amount of carbon dioxide, but this would be much cheaper than using an Acidulant.

However predictions based on simple aqueous systems are often misleading when applied to bakery mixes, such as dough or batter, which are complex mixtures within which a number of competing reactions may be occurring and which, during the baking process, forms a matrix capable of immobilising the reacting species before the reactions are complete.

In practice we found that baking dough with sodium bicarbonate and calcium chloride, in the proportions required for the above reactions gave a product with an unacceptably high alkalinity and poor leavening effect. Adding an excess of the calcium salt was not an apparent option, since calcium chloride is itself alkaline, and would violate the normal rule in leavening of using as near to stoichiometric amounts as possible. We therefore concluded that the presence of Acidulant was essential.

We have found, however, that each of the objects of the invention can be achieved by adding, to a mixture of bicarbonate and Acidulant, sufficient Precipitant selected from water soluble alkaline earth metal salts to interact with the bicarbonate, or its decomposition products, and/or with the Acidulant.

We discovered that when a Precipitant is added in sufficiently high levels to a mixture of bicarbonate and Acidulant, such that the total molar proportion of Precipitant and Acidulant to bicarbonate is in a stoichiometric excess, there is a surprising beneficial interaction between the Precipitant and each of the other two components of the mixture.

The Precipitant accelerates the release of carbon dioxide by the bicarbonate at the critical stage in baking when the crumb structure is starting to form. This makes the system more efficient and reduces the amount of leavening agents required to produce a given increase in volume.

We have also observed that the presence of Precipitant results in a lighter crumb than when alkaline earth metal ions are absent.

We have further discovered that water-soluble salts of both calcium and magnesium increase the effectiveness of most of the Acidulants commonly used in baking, so that a smaller amount is required to achieve a given lowering of pH. This makes it possible to reduce the amount of expensive Acidulant and/or to use cheaper Acidulants to achieve the same results.

We have found that when calcium and/or magnesium salts are added to systems containing excess Acidulant, we can lower the pH further than has hitherto been possible with Acidulants acceptable in bakery, while using smaller excesses of Acidulant. In particular we can achieve, for the first time using Acidulants suitable for leavening formulations, pH values low enough to permit the efficient use of preservatives, while at the same time saving on the cost of Acidulant.

We have also discovered that the use of Precipitant in systems containing SAPP reduces or eliminates the characteristic flavour of pyrophosphate.

Finally our observations of the increased effectiveness of our leavening systems and the beneficial effect of calcium on the colour of the crumb caused us to revisit Acidulant-free systems. In our initial experiments we had assumed that the amount of bicarbonate required would be double that normally used, in order to compensate for the fact that only 50% of the carbon dioxide is released compared to the normal acid/base system.

We also assumed that, in order to obtain a neutral pH, the amount of Precipitant would need to be stoichiometric, as in conventional systems, so as not to leave an excess of either alkaline reagent.

Counterintuitively we discovered that reducing the amount of bicarbonate added to the dough while increasing the amount of alkaline Precipitant relative to that required by the stoichiometry resulted in improved leavening and a product which, though high in pH, did not exhibit the adverse effects normally associated with high alkalinity. This offers the possibility of acceptable products of sufficiently high alkalinity to be self-preserving, by combining reduced water activity and high pH

THEORY

A surprising feature of the leavening systems of the invention is the rapid release of carbon dioxide at the critical point in the baking process when the crumb structure is beginning to form. Without wishing to be limited by any theory, we believe that in conventional baking at the temperatures that this occurs two reactions are competing. The first is the acid/base reaction between the bicarbonate and the Acidulant, and the other is the thermally driven disproportionation of the bicarbonate which involves an equilibrium disproportionation of bicarbonate into carbon dioxide and carbonate, and is inhibited at room temperature by the high solubility of carbon dioxide. At elevated temperatures the carbon dioxide is insoluble and is evolved rapidly, ceasing to be a constraint.

Because, in conventional systems, the carbonate goes on to react with the Acidulant, the second reaction has not attracted attention. However we believe that alkaline earth metal ions remove carbonate by precipitation at a substantially higher rate than the acid base reaction, thereby shifting the equilibrium and accelerating the thermally driven disproportionation. As a result there is a surge in the evolution of carbon dioxide at the stage in the baking process when it is most effective. This allows a more efficient use of the active ingredients.

A further surprising feature of the invention is the way the precipitants react with most Acidulants. Without wishing to be limited by any theory we believe that those Acidulants that form water insoluble salts with the alkaline earth metal react with alkaline earth metal salts under baking conditions, to precipitate an alkaline earth metal salt of the Acidulant and release an equivalent amount of the conjugate acid, e.g.

$$CaCl_2 + 2HA \rightarrow CaA_2 + 2HCl$$

This reaction does not cause any significant evolution of carbon dioxide at room temperature, but releases the conjugate acid on heating. Where, as in the case of hydrochloric acid, the conjugate acid is stronger than the Acidulant this causes a sharp drop in pH to lower levels than those attainable by the Acidulant itself. We believe that the release of stronger conjugate acid may contribute to the surge in carbon dioxide at elevated temperature. We believe a similar effect may be produced by Acidulants that complex with the Precipitant.

An additional surprising and beneficial effect of adding alkaline earth metal salts to some Acidulants, has been observed with Acidulants, such as phosphorus oxyacids and their acid salts, in which one or more of the replaceable hydrogen atoms has too high a $pK_a$ to react with bicarbonate. In this case the alkaline earth metal salt is able to react with all the replaceable hydrogens, releasing one mole of the conjugate acid for each mole of replaceable hydrogen, increasing the effective basicity of the Acidulant. The resulting reduction in the amount of phosphate and aluminium required, e.g. when using the two most commonly used Acidulants, SAPP and SALP, has both health and taste benefits. The phenomenon can also be used to activate Acidulants which are normally too weak to react with bicarbonate, such as di-sodium and potassium phosphate.

A major factor inhibiting the attainment of low pH using pyrophosphates such as SAPP is the strong buffering action of the partially neutralised pyrophosphate ion. The Precipitant precipitates pyrophosphate so removing the buffer.

In the case of SAPP the accepted mechanism for the reaction with bicarbonates is $$2Na_2H_2P_2O_7 + 4NaHCO_3 \rightarrow 2Na_4P_2O_7 + 4H_2O + 4CO_2$$

The above mechanism would give rise to 100% liberation of the available carbon dioxide. It is however implausible, since it would entail both of the replaceable hydrogen atoms of the SAPP reacting with bicarbonate. The $pK_a$ value measured for the deprotonation of the second hydrogen of the SAPP molecule is too high for it to react with a weak base such as sodium bicarbonate to any significant extent.

We have postulated an alternative mechanism, according to which the SAPP reacts with bicarbonate to form trisodium pyrophosphate and sodium carbonate, releasing 75% of the available carbon dioxide:

$$2Na_2H_2P_2O_7 + 4NaHCO_3 \rightarrow 2Na_3HP_2O_7 + Na_2CO_3 + 3H_2O + 3CO_2.$$

A subsequent cyclical reaction is then possible, commencing with the reprotonation of the strongly basic carbonate by the trisodium pyrophosphate:

$$Na_3HP_2O_7 + Na_2CO_3 \rightarrow Na_4P_2O_7 + NaHCO_3$$

With successive cycles the carbon dioxide released would tend asymptotically to 100%.

We have found that when SAPP is heated with sodium bicarbonate in aqueous solution at 90° C. for fifteen minutes, the amount of carbon dioxide released is not 100% as predicted by the currently accepted mechanism, but 78%, which is consistent with our proposed mechanism. However the addition of calcium chloride in accordance with our invention raises the amount of carbon dioxide evolved to over 97%, thus achieving in practice the result that the current incorrect theory promises, but fails to deliver.

The effect of the alkaline earth metals on the lightening of the crumb structure is surprising, since the darkening of the crumb has been shown to be caused by the Maillard reaction between amino acids and sugars. It has been shown ("Impact of Mineral Elements Ca, Mg and Fe on the Maillard Reaction in Model Systems with Casein" Danute Terese Ramonaityte, FOODBALT 2008) that calcium promotes the Maillard reaction, and should therefore exacerbate the problems that it causes. However the Maillard reaction also requires alkaline conditions.

We believe that the darkening effect occurs in the batter at an early stage in baking. In conventional acid/base leavening systems the pH falls during baking, the batter being relatively alkaline. However we believe that the opposite occurs in our novel systems. The alkaline earth metal ions disproportionate some of the bicarbonate to form alkaline earth metal carbonate and carbonic acid. The latter lowers the pH of the batter inhibiting the Maillard reaction and hence the darkening effect. When the batter is heated the carbon dioxide is driven off and the pH rises. At this point the formation of a crumb structure and loss of moisture inhibit further chemical reaction. An additional lightening effect arising from the use of calcium chloride according to our invention, may result from the precipitation of calcium carbonate.

We believe that the off flavours associated with high pH in conventional bakery are due partly to bitter products of the Maillard reaction and also to sodium carbonate, formed by thermal degradation of bicarbonate, if the amount of Acidulant is less than stoichiometric. The carbonate has a soapy taste. However in our invention the high pH is mainly due to a residue of the excess calcium chloride, which does not give rise to off flavours. Thus, while we do not expect to be able to obtain products with pH less than 8 without using at least some Acidulant, using our invention such high pH values do not cause the usual problems.

The above theories are almost certainly an oversimplification, since they do not explain all our observations, and in particular the difference between calcium and magnesium in systems in which the amount of Acidulant is less than the stoichiometric amount that would be required in the absence of Precipitant. We believe that the reaction between the Precipitant and the alkali metal bicarbonate proceeds via the alkaline earth metal bicarbonate, e.g.

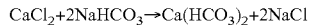
$CaCl_2 + 2NaHCO_3 \rightarrow Ca(HCO_3)_2 + 2NaCl$

The bicarbonate intermediate then disproportionates precipitating calcium carbonate and evolving carbon dioxide:

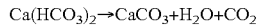
$Ca(HCO_3)_2 \rightarrow CaCO_3 + H_2O + CO_2$

The calcium bicarbonate intermediate is substantially more soluble than the corresponding magnesium salt, and the rate of reaction of the magnesium is correspondingly slower.

PRIOR ART

U.S. Pat. No. 5,882,712 (Wu) describes the use of calcium or magnesium chloride, or hydrates thereof, allegedly as an acid in a balanced leavening system containing just sufficient total "acid" (including the calcium and magnesium salts) to displace all the available carbon dioxide in what Wu describes as an acid/base reaction.

This disclosure is difficult to interpret since uncontaminated calcium and magnesium chlorides, as commonly supplied are not in fact Acidulants as herein defined. They do not have replaceable hydrogen and do not lower the pH of water. They are actually alkaline, having a pH greater than 8.5 in aqueous solution, a pH which is usually associated with problems in bakery. The Wu patent notes that they are Lewis acids, but that is irrelevant since the term "Lewis acid" is a misnomer, referring, not to a particular type of acid as commonly defined, but to something entirely different, involving the formation of co-ordinate bonds by donation of electron pairs. The term "acid" as used in the art is not understood by the skilled practitioner to embrace Lewis acids.

We have never observed an acid/base reaction between uncontaminated calcium or magnesium chloride and sodium bicarbonate, and such a reaction would appear to conflict with the currently accepted laws of chemistry. When we allowed aqueous solutions of calcium chloride and sodium bicarbonate to stand at room temperature we could not detect any evolution of carbon dioxide.

The only reference to "acid calcium chloride" that we have been able to trace, U.S. Pat. No. 4,464,443 (Farrell et al), refers to calcium chloride acquired for use as a desiccant from an unidentified source as being acid, and requiring neutralisation with sodium carbonate prior to use. This must refer to acid contamination since the only reaction between calcium chloride and sodium carbonate of which we are aware is that leading to the precipitation of calcium carbonate from aqueous solution described above. This is an ion exchange reaction, not an acid/base reaction and does not give rise to any significant evolution of carbon dioxide. The identity of Wu's acid reagent is therefore something of a mystery.

Several of the common Acidulants used in baking are available in alkaline, as well as acidic forms, depending on the degree of neutralisation. The skilled reader would probably therefore assume that the "acid" alkaline earth metal chlorides described by Wu were similarly partially neutralised. However we have found that free hydrochloric acid reacts too rapidly to provide useful leavening.

Wu does not describe the source of his "acid", specify any particular degree of neutralisation or quote any pH values. Without such details the reader could not calculate the amount required for a balanced system. In his examples Wu uses a ratio of calcium chloride to bicarbonate corresponding to the stoichiometric ratio that would be required if his calcium chloride were in fact a diprotic acid.

It is possible Wu's calcium chloride was contaminated with acid from some unspecified component of the dough, such as chlorinated flour, which would account for the evolution of carbon dioxide prior to heating, and that the author misinterpreted the thermally driven disproportionation of the bicarbonate in baking as an acid/base reaction.

Whatever the explanation, Wu's formulations do not provide the enhanced leavening effect, which is a feature of our invention. We have attempted to repeat Wu's examples, using normal commercial calcium chloride, with the same negative results as those obtained in our own unsuccessful attempts to use calcium chloride in stoichiometric amounts in the absence of conventional Acidulants.

Wu's insistence on using a "balanced system" (treating calcium chloride as effectively equivalent to a diprotic acid) reflects the mind set in the art requiring strict adherence to stoichiometric ratios. It therefore teaches away from our invention, which requires a substantially higher total amount of Precipitant and Acidulant, relative to bicarbonate, than is required for Wu's balanced system.

US2015/0132437 A1 describes the addition of catalytic amounts of magnesium and potassium ions to a conventionally balanced leavening system in order to control the release of carbon dioxide in canned dough during storage. The patent teaches away from the use of calcium and the amounts of magnesium used were insufficient to precipitate the Acidulant, or to boost the evolution of carbon dioxide at the critical stage of baking.

U.S. Pat. No. 3,653,917 describes the addition of calcium chloride to angel cake food mixes to facilitate the recovery of sub-standard batches. There is no suggestion that the additive would have any effect on the leavening system, and the levels recommended are too small to be effective in this respect.

THE INVENTION

Our invention therefore provides a leavening agent comprising:
(1) An alkali metal or ammonium bicarbonate;
(2) At least 0.1 and preferably at least 1 mole per mole of bicarbonate of Precipitant optionally comprising a Precipitating Acidulant; and
(3) Optionally an Acidulant; wherein (2) and (3) are present in a total amount from 105 to 800% of the stoichiometric amount that would be required to react fully with (1) in a boiling aqueous solution.

Preferably the Acidulant is present in a non-stoichiometric proportion based on the acid/base reaction between the Acidulant and the bicarbonate Preferably the amount of Acidulant is less than 90%, more preferably less than 10% of the stoichiometric amount.

According to an alternative embodiment our invention provides a leavening agent comprising:
(1) Alkali metal bicarbonate;
(2) A Precipitant and/or Precipitating Acidulant, in a total proportion sufficient to provide from 1 to 8.8 g, and preferably at least 1.1 g, Precipitating Cation per 100 mmol bicarbonate; and
(3) An Acidulant, which may be or may comprise said Precipitating Acidulant, in a total proportion sufficient to provide from 0.025 to 0.2 g Replaceable Hydrogen per 100 mmol of bicarbonate.

Alternatively the invention provides a leavening agent comprising as components:
(1) An alkali metal bicarbonate;
(2) A Precipitant; and;
(3) Optionally an Acidulant; wherein y>x+5 between x=0 and x=47.5, and between x=52.5 and 105; and y>80 between x=47.5 and x=52.5; where x is the amount of sodium bicarbonate mmols per 100 mmols of the said components that would remain after complete reaction with any non-phosphate Acidulants present and y is the amount of Precipitant in mmols per 100 mmols of the said components.

Alternatively, the invention provides a leavening agent comprising:
(1) Alkali metal bicarbonate;
(2) A Precipitant and/or Precipitating Acidulant, in a total proportion sufficient to provide c=from 25 to 200; and
(3) An Acidulant, which may be or may comprise said Precipitating Acidulant, in a total proportion sufficient to provide h=from 25 to 200, and preferably h+2c>100; where c is the total mmol Precipitating Cation per 100 mmol bicarbonate and h is the total mmol hydrogen ion per 100 mmol bicarbonate.

According to a further embodiment the invention provides a leavening agent comprising:
(1) Alkali metal or ammonium bicarbonate;
(2) An Acidulant that forms a non-water soluble calcium or magnesium salt sufficient to provide more than 0.105 g Replaceable Hydrogen per 100 mmol bicarbonate;
(3) A Precipitant that is a water soluble salt of an alkaline earth metal capable of precipitating or complexing with said Acidulant in an amount sufficient to provide a final pH below 6.5 when the leavening agent is heated in a bakery mix;
(4) An effective amount of a preservative.

Alternatively the invention provides a leavening agent comprising:
(1) Alkali metal bicarbonate;
(2) an Acidulant that forms a water insoluble calcium or magnesium salt sufficient to provide more than 105 mmols replaceable hydrogen per 100 mmols bicarbonate;
(3) A Precipitant that is a water insoluble salt of an alkaline earth metal capable of precipitating said Acidulant with an acid which is stronger than said Acidulant in an amount sufficient to provide a final pH below 6.5 when the leavening agent is heated in a bakery mix; and
(4) An effective amount of a preservative.

The invention further provides a leavening agent according to any of the preceding embodiments, which comprises a mixture of a bicarbonate, calcium chloride and an orthophosphate or pyrophosphate Acidulant.

The invention further provides a baking powder comprising a leavening agent as aforesaid.

Our invention further provides a self-raising flour comprising a leavening agent as aforesaid.

Our invention further provides a bakery mix comprising a leavening agent as aforesaid.

According to a further embodiment our invention provides the use in baking of a leavening agent as aforesaid.

According to a further embodiment our invention provides a method of baking comprising heating a bakery mix as aforesaid.

Our invention further provides a confection prepared by baking a bakery mix as aforesaid.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The Bicarbonate

The alkali metal bicarbonate may be lithium, but is preferably sodium or, most preferably, on health grounds as well as slightly better leavening, potassium bicarbonate. Ammonium bicarbonate is effective, but is not widely used in bakery. Mixtures of bicarbonates may be used. Alkali metal carbonates do not evolve carbon dioxide in the presence of Precipitants, unless Acidulants are also present, however the term "bicarbonate" as used herein includes hydrates and double salts of bicarbonate, such as sodium sesquecarbonate, although such double salts are relatively inefficient and are not recommended, since they may require up to three times the amount of Precipitant to precipitate all the carbonate.

The Precipitant reacts with the bicarbonate to precipitate one mole of calcium carbonate for each mole of carbon dioxide. Therefore in Acidulant-free systems the carbon dioxide evolved is only about half that obtained in conventional leavening systems. This necessitates the use of increased amounts of bicarbonate, relative to flour, to obtain an equivalent leavening effect. However, the increased efficiency with which the bicarbonate is used at least partly compensates for any carbon dioxide trapped. The actual amount of bicarbonate used in practice varies according to the particular recipe. The amount required with leavening systems of our invention may typically be at least 10% greater than that normally recommended, preferably at least 20%, more usually at least 30% greater, but less than 70%, usually less than 60%, more commonly less than 50% greater. In systems according to our invention containing Acidulants the amount of bicarbonate can often be reduced compared to conventional recipes.

The bicarbonate is preferably milled to a particle size substantially all less than 500μ. Preferably, in order to avoid visible spotting in batter based products, the particle size is all less than 400μ. To avoid spotting in dough based products we particularly prefer a particle size all less than 250μ, but to avoid impaired shelf life of the end product the particle size is more preferably all less than 200μ, most preferably less than 150μ.

The D50 of the bicarbonate is preferably less than 200μ, more preferably less than 150μ, even more preferably less than 100μ. However to minimise caking, and avoid excessive dust, we prefer that the D50 is greater than 35μ, more preferably greater than 40μ, even more preferably greater than 50μ, most preferably greater than 60μ.

We have found milling to reduce the D50 to a level sufficient to avoid localised inhomogeneities in dough generally causes caking problems and excessive fines. The product may be milled to a D50 greater than that required to reduce all the coarse particles, and removing the latter by sieving. The sieved particles may be recycled. We particularly prefer to mill to a D50 between 50 and 300μ, and sieve to remove at least those particles greater than 400μ.

Preferably the D50 of the milled product prior to sieving is less than 200μ, more preferably less than 150μ, most preferably less than 120μ, but greater than 70, most preferably greater than 90μ. Preferably the product is sieved to remove particles greater than 300μ, more preferably greater than 250μ. We do not exclude the possibility of obtaining the desired particle size directly by selecting a mill with a very narrow size distribution, such as a universal mill, e.g. a turbine and screen mill.

Particularly in the case of potassium bicarbonate, we prefer bicarbonate that has been coated to inhibit caking and/or degradation by atmospheric moisture or premature interaction with the Acidulant. Coatings may comprise alkaline earth metal carbonates, silicon dioxide and/or anionic surfactants, such as alkali metal or alkaline earth metal soaps. Particularly preferred are hydrophobic coatings as described in EP 2 547 211

The Precipitant

The Precipitant is preferably a Non-acidic calcium salt. Magnesium alone is a relatively ineffective precipitant for carbonate. The surge in carbon dioxide evolution in the latter stages of baking that is one of the most important features of our invention is smaller with magnesium, requires higher levels of the salt and occurs later in the baking process.

Magnesium salts, and especially those of strong acids, lower the pH that can be obtained using most acidulants. The relative effectiveness of calcium and magnesium in this respect depends mainly on the solubility of their salts with the Acidulant. Generally calcium is more effective than magnesium. However in pyrophosphate systems, where both metals form very insoluble salts, they are equivalent. Calcium is more effective in orthophosphate systems, neither produce a big effect with citrates and both form soluble fumarates, and do not significantly affect the pH of fumaric acid systems or of GDL.

Mixtures of calcium and magnesium containing at least 1, preferably at least 2, more preferably at least 3, still more preferably at least 4, most preferably at least 5% by weight calcium may be used and may perform similarly to calcium. Zinc is mildly acidic and seems unlikely to be commercially attractive, except as a minor component in admixture with calcium and/or magnesium, e.g. for nutritional purposes. Aluminium is not currently recommended on health grounds. All references herein to calcium are to be construed wherever the context permits as including calcium, magnesium and mixtures thereof.

Examples of suitable salts include non-acidic organic salts such as salts of formic, acetic, fumaric, lactic, citric, aconitic, itaconic, citraconic, tartaric, adipic, ascorbic, malic and/or lactobionic acid, and inorganic salts such as chlorides and sulphates. Mixtures of salts are often preferred. The Precipitant may be selected at least partly for its organoleptic effects. Thus chlorides with sodium bicarbonate give rise to sodium chloride in the product, which is desirable in many recipes. It enables the preservative and taste benefits of salt to be obtained without adding extra salt and so increasing the sodium content. Sodium chloride may, however be unacceptable in other recipes, and many of the other available alkaline earth metal salts have similar positive or negative effects depending on the recipe.

Precipitants increase the Neutralising Value of certain Acidulants, such as SAPP, SALP and mono and di sodium or potassium orthophosphates, wherein the $pK_a$ of one of the hydrogens is normally too high to contribute to the leavening effect. It has been found that water soluble calcium or magnesium salts of acids sufficiently strong to react with bicarbonates can react with all the Replaceable Hydrogen, up to a $pK_a$ of about 14, releasing an equivalent amount of the conjugate acid. This has the effect of substantially increasing the Neutralising Value of the Acidulants such as SAPP and SALP, and approximately doubles the Neutralising Value of MSP, allowing big reductions in the amount of Acidulant needed.

Precipitants inhibit the buffering action of pyrophosphates which substantially reduces the amount of Acidulant needed to achieve pH values below 7 when using SAPP. Precipitants also reduce or eliminate the pyrophosphate flavour which many people find objectionable in SAPP formulations.

In the case of di alkali metal phosphates such as disodium and di potassium phosphate, which are not normally effective Acidulants, the addition of a Precipitant such as calcium or magnesium chloride permits these compounds to be used as Acidulants.

The Precipitant preferably has a Neutralising Value insufficient to be of practical use as an Acidulant, e.g. zero or lower. We prefer Neutralising Values greater than −1, preferably greater than −0.5, most preferably greater than −0.1, in order to avoid excessive alkalinity of the product. We do not exclude the use of Precipitants that are contaminated with acid, but any such acid should be taken into account when calculating the total Acidulant, and should not be such as to cause significant premature release of carbon dioxide.

When it is desired to lower the pH it is preferred to use Precipitants which are salts of stronger acids than the Acidulant, which release the stronger conjugate acid on reaction with the Acidulant.

In our preferred, Acidulant-free, formulations the Precipitant is preferably present in at least 110% of the stoichiometric amount required to precipitate all the carbonate formed by the decomposition of the bicarbonate, more preferably more than 120%, even more preferably at least 130%, still more preferably at least 140%, most preferably at least 150% of the stoichiometric, but preferably less than 250%, more preferably less than 200%, even more preferably less than 175%. These proportions may be proportionately reduced when Acidulant is present Generally the Precipitant, including any Precipitating Acidulant, is preferably present in a total proportion of greater than 1.1 g Precipitating Cation per 100 mmol bicarbonate, more preferably greater than 1.2 g, even more preferably greater than 1.4 g, still more preferably greater than 1.5 g. The proportion of Precipitant per 100 mmol bicarbonate is preferably less than 8 g, more preferably less than 7 g, even more preferably less than 5 g, most preferably less than 2.5 g.

Alternatively there is preferably more than 28 mmol Precipitating Cation per 100 mmols of alkali metal bicarbonate, more preferably more than 30, even more preferably more than 35, still more preferably more than 40, most preferably more than 50 mmols, but preferably less than 100, more preferably less than 80, even more preferably less than 70, most preferably less than 65 mmols.

Due to the lower effectiveness of magnesium compared to calcium in systems which do not contain a stoichiometric excess of Acidulant relative to the amount required to react with the bicarbonate in the acid/base reaction, we prefer to use magnesium in a 10% higher proportion to bicarbonate than those indicated above, when it is the sole Precipitating Cation in such systems, more preferably 15% higher most preferably 20% higher.

The preferred particle size of the Precipitant will depend on solubility and storage stability. In the case of calcium chloride, the particle size is preferably greater than 0.5 mm, more preferably greater than 1 mm to avoid deliquescence. Smaller particle sizes may need to be protected from moisture, e.g. by keeping in a sealed container or by mixing with a hydrophobic filler, such as stearin. We prefer calcium chloride prills having a particle size less than 3 mm, more preferably less than 2 mm. Larger particles may require extended periods of mixing in order to ensure complete dissolution. Other Precipitants, which are more stable, but less soluble than calcium chloride may require milling to ensure rapid dissolution, e.g. to less than 0.5 mm.

The Acidulant

We prefer Acidulant-free systems on economic grounds. The high pH values which characterise our preferred systems do not have the deleterious effects commonly associated with high pH in conventional acid/base systems. However some customers may continue to stipulate a low pH to meet special requirements, from habit or to allow the use of preservatives. An Acidulant is generally required in order to obtain a product with pH below 8. The Acidulant is typically a compound that, when present in a stoichiometric amount in aqueous solution, reacts with bicarbonate. The Acidulant preferably has a Neutralising Value greater than 0.5, more preferably greater than 1, even more preferably greater than 2, most preferably greater than 3.

The Acidulant, including any Precipitating Acidulant, is preferably used in the minimum amount required to achieve the desired reduction in pH. This may sometimes require a total proportion sufficient to supply at least 50 mmol hydrogen ion per 100 mmol alkali metal bicarbonate, preferably more than 60, more preferably more than 80. When not required to allow the use of preservatives, we prefer to use less than 100, more preferably less than 95, even more preferably less than 90, most preferably less than 85 mmol per 100 mmol bicarbonate.

The Acidulant preferably has a particle size substantially all less than 400μ, more preferably less than 250μ and most preferably at least 90% by weight less than 100μ. It may for example comprise phosphorus oxyacids and/or their mono-, di- and/or tri-basic salts such as SALP, SAPP, phosphoric acid, mono- and/or di-sodium and/or potassium phosphates, mono- and/or di-calcium phosphate and/or organic acids and/or their acid salts such as MSC, glucono-delta-lactone, fumaric acid, maleic acid, malic acid, succinic acid, adipic acid, tartaric acid, mono sodium tartrate, citraconic acid, aconitic acid, itaconic acid, mono potassium citrate and/or tartrate, hydrolysed lactones and/or polylactic acid and/or sodium aluminium sulphate. The effectiveness of the Precipitant may be adversely affected by the presence of calcium sequestrants such as citric acid, which are therefore better avoided unless required for reasons not directly related to leavening effectiveness.

Highly active acids, such as hydrochloric acid are unsuitable for use as bakery Acidulants, even in small amounts, except when formed transiently in situ by interaction between the Precipitant and the Acidulant.

Because any Acidulant added in accordance with our invention may be used in smaller proportions in the bakery mix than in conventional baking powders it is possible to use more active Acidulants than would normally be acceptable, such as carboxylic acids, and especially dicarboxylic acids such as fumaric acid. These are substantially cheaper than the Acidulants commonly in use, and permit avoidance of phosphates, which have health implications and may leave aftertastes.

Precipitating Acidulants may be used to supply all or part of the Precipitating Cation and/or Acidulant required. Particularly preferred are the partially neutralised alkaline earth metal salts of dicarboxylic acids such as fumaric acid.

Either or both of the Precipitant and the Acidulant may advantageously be encapsulated. Suitable encapsulants include triglycerides, hydrogenated fatty acids, gums, alginates, alginic acid, starches and carbohydrates. They may be coated with anionic surfactants, by milling under high shear, as described in EP 2 547 211.

Preservatives

When it is desired to use a preservative, it is generally necessary to lower the pH below 6.5 and preferably below 6 for the preservative to be effective. No Acidulant is known that is sufficiently weak to retain a useful leavening capacity into the critical stages of baking and also strong enough to lower the pH to such levels. However such levels are easily attained by adding a calcium or magnesium salt of a sufficiently strong acid to any Acidulant that is precipitatable thereby.

In order to allow effective use of preservatives, we prefer to employ a precipitatable Acidulant such as MSC, SAPP, SALP or MCPa, in an amount at least 105% of the stoichiometric weight, more preferably at least 107%, even more preferably at least 110% most preferably at least 115%. We do not normally require amounts over 400% of the stoichiometric weight and prefer to use less than 300%, more preferably less than 150%, most preferably less than 120% of the stoichiometric weight of Acidulant.

Preservatives such as sorbic acid, potassium sorbate, sodium sorbate, calcium sorbate, sulphur dioxide, sodium sulphite, sodium bisulphite, sodium metabisulphite, potassium sulphite, potassium metabisulphite, potassium hydrogen sulphite, calcium sulphite, calcium hydrogen sulphite, propionic acid, sodium propionate, potassium propionate and/or calcium propionate, may be used in effective proportions. The proportions required will depend on the recipe, the particular preservative, the pH attained and the degree of protection required, but are generally lower than the excessive amounts that have hitherto been commonly used to compensate for the high pH values that were the best attainable. Typically the proportion of preservative may be greater than 0.5%, preferably greater than 2%, more preferably greater than 5% by weight, but preferably less than 15%, more preferably less than 10% based on the weight of the leavening system.

In the absence of Acidulant, sufficiently high levels of Precipitant may permit acceptable products with a sufficiently high pH and sufficiently low water activity to provide extended shelf life without added preservatives.

Baking Powder

The leavening agent of the invention may be incorporated into a baking powder blend. Preferably the latter additionally contains a filler. The filler may for example comprise starch, wheat flour, cellulose, dextrin, calcium carbonate and/or calcium sulphate, and is preferably present in a proportion of at least 2% by weight, based on the total weight of the blend, more preferably at least 5%, even more preferably at least 10%, most preferably at least 15%, but preferably less than 50%, more preferably less than 30%, most preferably less than 20%. The blend may additionally comprise other, conventional ingredients including, by weight based on the weight of the blend:

- Oil, e.g. vegetable oil, such as olive oil or corn oil, mineral oil, silicone oil, glycerol, and/or poly glycerol ricinoleate in proportions up to 5% by weight, preferably up to 2%, more preferably up to 1%;
- Salt, such as sodium and/or potassium chloride in proportions usually up to 35% by weight, preferably up to 30%, more preferably up to 20%, most preferably up to 15%, and typically at least 2%, preferably more than 5% most preferably more than 10%;
- Acidity regulators such as the lecithin, sodium, and/or potassium salts of lactic, citric, acetic, tartaric, adipic, ascorbic, malic and/or lactobionic acid, oxystearin and or lecithin, in proportions up to 10% by weight, preferably greater than 1%, more preferably greater than 2%, most preferably greater than 3%, but preferably less than 8%, more preferably less than 7%, most preferably less than 6%;
- Anti-caking agents such as silicon dioxide, alkali metal and/or alkaline earth metal silicates in proportions up to 5% by weight; and/or
- Sweeteners, such as sucrose, dextrose or glucose, flavourings, fragrances and/or colourings, as desired.

It should be noted that several of the foregoing ingredients may be, or may contain traces of, acids, which may be provided, at least in part by the Acidulant and, if added separately, should be taken into consideration when estimating the total amount of Acidulant.

The quantities of salt quoted above are those commonly added to baking powder. However an important benefit of using calcium or magnesium chloride as the Precipitant is that they form sodium chloride in situ by reaction with sodium compounds present from other sources, avoiding the need for added salt. Thus the benefits of sodium chloride are obtained without the health implications of increasing the amount of sodium in the product.

Other Bakery Mixes

The leavening agent of the invention may also be incorporated into self-raising flour. The latter may for example comprise at least 0.5% by weight of the leavening agent, preferably at least 1%, more preferably at least 2%, most preferably at least 5%, but less than 15%, more preferably less than 10% most preferably less than 8%.

Leavening agents of the invention, or baking powders comprising them, may be incorporated into bakery mixes. These may be batters (i.e. pastes in which the volume of liquid exceeds that of solid) or doughs (i.e. pastes in which the volume of solid exceeds that of liquid) and may be adapted for the production of a range of baked confections. The leavening agents may be used in conjunction with yeast.

It will be apparent that the leavening agent may be preformulated as a baking powder or prepared in situ by adding the ingredients separately to the dough or batter.

Baked products according to our invention include any leavened confection including, without limitation, bread, cakes, biscuits, waffles, scones, buns, cookies, batter coatings, sponges and puddings.

The invention will be illustrated by the following examples in which all proportions, unless otherwise stated, are percentages by weight based on total weight. All references to calcium chloride are to normal commercial calcium chloride, which was Non-acidic. The Neutralisation Value was found to be negative (−0.055 by the method of Brose, Becker and Bouchain vs). A 0.5 molar solution had a pH greater than 8. When 2 g of the calcium chloride in 200 ml deionised water was mixed with 0.25 g sodium bicarbonate in 50 ml deionised water, and the mixed solutions were stored at 23° C. and 764 mm Hg pressure, no evolution of carbon dioxide could be detected using Chittick apparatus.

EXAMPLE 1

Bakery trials with sodium bicarbonate and Precipitant, in the stoichiometric amount required to precipitate the carbonate formed by thermal decomposition of the bicarbonate in aqueous solution, as in the "balanced" system described by Wu (vs), had shown wide variations in pH, which was undesirably high giving a dark crumb and bitter aftertaste. To compensate for the expected 50% reduction in $CO_2$ available from the thermal decomposition compared with conventional acid/base leavening systems, the amount of bicarbonate was proportionately increased. None of the tests gave a commercially viable product.

An Acidulant-free composition according to the invention comprising a substantial excess of Precipitant over the stoichiometric amount, and using conventional levels of addition of bicarbonate was compared to one of the earlier formulations, and also with sodium bicarbonate alone at both the conventional and increased levels and calcium chloride alone, in the following Madeira cake recipe.

| Heat treated cake flour | 300 |
| Caster sugar | 391.8 |
| Skimmed milk powder | 22.2 |
| Salt | 7.5 |
| Sweetener | 211.2 |
| Skimmed milk | 19.6 |
| Water | 177.9 |

The comparison consisted of 8.9 g sodium bicarbonate and 5.9 g calcium chloride. The example consisted of 5.11 g sodium bicarbonate and 5.9% calcium chloride. The results are shown in the following table I:

TABLE I

|  | pH | Volume ($cm^3$) | Colour |
| --- | --- | --- | --- |
| Comparison | 8.6 | 1152 | Light brown |
| Example 1 | 8.4 | 1183 | Off white |
| 8.9% soda | 9.2 | 1012 | Brown |
| 5.11% soda | 8.8 | 968 | Dark brown |
| 5.9% | 6.3 | 952 | White |

The product of the invention although using substantially less bicarbonate than the control provided a greater increase in volume, lower pH and almost no discolouration.

EXAMPLES 2-4

Four formulations were prepared using mixtures of Precipitant and Acidulant at various levels and compared with a commercial product in bakery trials, using the following recipe.

A scone mix was prepared with the composition, based on weight of flour:

| Plain flour | 100 |
| Baking powder | 10.3 |
| Caster sugar | 20 |

-continued

| | | |
|---|---|---|
| Unsalted butter | 30 | |
| Milk | 50 | |

The pH of the scones was noted. The results are set out in the following table II, in which all proportions are in grams.

TABLE II

| Example | NaHCO$_3$ | flour | CaCl$_2$ | MCPa | SAPP | pH |
|---|---|---|---|---|---|---|
| Comparative | 0.74 | 0.4 | 0 | 0 | 1.04 | 7.3 |
| 2 | 1.14 | 0.24 | 0.495 | 0.47 | 0 | 8.8 |
| 3 | 0.765 | 0.24 | 0.47 | 0.495 | 0 | 7.35 |
| 4 | 0.64 | 0.27 | 0.62 | 0.35 | 0 | 7.9 |
| 5 | 0.39 | 0.24 | 0.78 | 0.2 | 0 | 6.7 |

EXAMPLE 6-8

Three leavening formulations according to the invention were tested in the following Madeira cake recipe of Example 1. The pH was acceptable in all cases and the examples had a brighter crumb than the control, which used a balanced Acidulant/soda system. The height in mm was measured in the centre and edge. No sagging was observed in the middle. The improved rise compared to the control resulted from a late surge in gas evolution. The results are set out in the following table in which proportions are percent by weight based on total weight

TABLE III

| | Control | 6 | 7 | 8 |
|---|---|---|---|---|
| Wheat flour | 18.5 | 0 | 0 | 0 |
| CaCl$_2$ | 0 | 29.8 | 14.5 | 11.9 |
| Calcium formate | 0 | 0 | 17.0 | 13.9 |
| MCPa | 0 | 27.2 | 26.5 | 0 |
| NaHCO$_3$ | 34.4 | 43.1 | 42 | 34.3 |
| SAPP | 47.1 | 0 | 0 | 0 |
| GDL[1] | 0 | 0 | 0 | 39.3 |
| Height (mid) | 74.07 | 86.43 | 89.03 | 91.46 |
| Height(edge) | 68.22 | 60.97 | 59.58 | 63.91 |
| pH | 7.7 | 7.8 | 7.7 | 8.2 |

EXAMPLES 9 and 10

Two phosphate-free baking powders according to the invention were prepared using fumaric acid as Acidulant. The two examples were used with a Madeira cake recipe in baking trials and compared with a commercial formulation. The results are set out in the following table IV, in which all proportions are in grams, and heights are in mm.

TABLE IV

| | CONTROL | 9 | 10 |
|---|---|---|---|
| Wheat flour | 3.6 | 0 | 0 |
| SAPP | 9.39 | 0 | 0 |
| CaCl$_2$ | 0 | 5.96 | 9.68 |
| NaHCO$_3$ | 6.81 | 12.78 | 12.78 |
| Fumaric acid | 0 | 6.64 | 6.64 |
| Total weight | 19.8 | 25.4 | 29.1 |
| Height (middle) | 87.83 | 91.38 | 93.27 |

TABLE IV-continued

| | CONTROL | 9 | 10 |
|---|---|---|---|
| Height (edge) | 62.67 | 62.47 | 59.28 |
| pH | 7.2 | 7.4 | 7.5 |
| Taste | sweet | sweet | sweet |
| Aftertaste | pyrophosphate | clean | CaCl$_2$ |

EXAMPLES 11-14

Four formulations with calcium formate as the sole Precipitant were prepared and tested in the scone recipe of example II. The pH of the scones was determined. The results are set out in the following table V.

TABLE V

| | MCPa | NaHCO$_3$ | MCP m | Ca formate | pH |
|---|---|---|---|---|---|
| 11 | 26.36 | 42.91 | 0 | 30.72 | 7.1 |
| 12 | 0 | 42.49 | 27.09 | 30.42 | 7.3 |
| 13 | 22.22 | 41.32 | 0 | 36.46 | 7.9 |
| 14 | 23.86 | 44.37 | 0 | 31.77 | 8.3 |

EXAMPLES 15-20

Six leavening formulations were prepared according to the invention, using a system comprising fumaric acid, sodium bicarbonate and various mixtures of calcium and magnesium chlorides. The formulations were used in the bakery mix of Example I and compared with a sample with only magnesium. The pH of the scones was noted. The results are set out in the following table VI, in which all proportions are in grams

TABLE VI

| CaCl$_2$:MgCl$_2$ | Fumaric | Soda | CaCl$_2$ | MgCl$_2$ | pH |
|---|---|---|---|---|---|
| 100:0 | 26.15 | 50.35 | 23.50 | 0.00 | 7.48 |
| 80:20 | 26.33 | 50.70 | 18.92 | 4.06 | 7.59 |
| 60:40 | 26.50 | 51.03 | 14.29 | 8.18 | 7.45 |
| 40:60 | 26.68 | 51.37 | 9.61 | 12.34 | 7.62 |
| 20:80 | 26.86 | 51.72 | 4.84 | 16.57 | 7.64 |
| 10:90 | 26.96 | 51.91 | 2.42 | 18.70 | 7.41 |
| 0:100 | 27.05 | 52.09 | 0.00 | 20.85 | 8.02 |

It will be seen that magnesium chloride alone gave a relatively high pH, but that the addition of even small amounts of calcium chloride significantly lowered the pH of the product.

EXAMPLES 21-22

Two phosphate-free baking powders according to the invention were prepared using fumaric acid as an Acidulant with calcium formate and calcium chloride respectively. They were compared with two SAPP based baking powders and two fumaric based baking powders using Acidulant only, in a standard Madeira cake recipe. The SAPP and pure fumaric based baking powders were used at two different addition levels. The lower addition level in baking trials and compared with a commercial formulation. The results are set out in the following table VII, in which all proportions are in percent by weight based on the weight of flour, and heights are in mm.

TABLE VII

|  | (SAPP) | (SAPP) | 21 | Fumaric | Fumaric | 22 |
|---|---|---|---|---|---|---|
| SAPP | 2.348 | 3.03 |  |  |  |  |
| $CaCl_2$ |  |  |  |  |  | 1.0325 |
| Calcium formate |  |  | 1.210 |  |  |  |
| $NaHCO_3$ | 1.703 | 2.213 | 2.213 | 1.703 | 2.213 | 2.213 |
| Fumaric acid |  |  | 1.150 | 1.175 | 1.526 | 1.150 |
| Height (middle) | 75.65 | 79.14 | 89.81 | 78.16 | 85.68 | 90.22 |
| Height (edge) | 67.78 | 67.81 | 62.23 | 63.23 | 62.99 | 61.94 |
| pH | 7.5 | 7.8 | 7.7 | 6.9 | 6.9 | 7.4 |
| Taste | Clean | Slight chemical | Clean | Slightly astringent | Slightly astringent | Clean |
| Crumb | Open and uneven | Very open and uneven | Tight soft. | Liquor logged | Liquor logged | Tight but soft. |

EXAMPLE 23

A solution of 0.821 g anhydrous mono calcium phosphate in 250 ml deionised water at 90° was titrated with 0.5M sodium hydroxide solution and the pH plotted against volume of added titrant. The first inflexion occurred at 6.5 ml corresponding to a Neutralisation Value of 37. A second inflexion was observed at 13 ml corresponding to a Neutralisation Value of 79.

The experiment was repeated in the presence of 3.5 g calcium chloride. A single inflexion was observed at 20.5 ml corresponding to a Neutralisation Value of 125. Similar titrations against monosodium phosphate gave a first inflexion corresponding to a Neutralisation Value of 68, in the absence of calcium chloride, and 139.5, with added calcium chloride. Thus addition of calcium chloride greatly increases the neutralisation value of both mono calcium and mono sodium phosphates. Similar titrations against fumaric acid showed no such change in the Neutralisation Value

EXAMPLE 24

40 g of mini scone dough was prepared and baked using dipotassium phosphate, $CaCl_2$ and sodium bicarbonate. The recipe was:
57 g plain flour
5 g skimmed milk powder
1 g salt
5 g vegetable oil
35 g water
0.75 g sodium bicarbonate
1.72 g dipotassium phosphate
1.1 g $CaCl_2$ The pH of a 1% solution of dipotassium phosphate was measured to be 9.3 at 25° C. The mini scone dough was baked at 225° C. for 13 minutes. The scones appeared light and fluffy.

The scones were left to cool, were crumbed in to a 250 ml beaker, mixed with 70 ml of deionised water and covered with Clingfilm. After 30 minutes a slurry was made out of the water/scone mixture by mixing with a spatula for 2 minutes. The pH of the slurry was found to be 7.7 using a pH electrode.

EXAMPLE 25

Four trial batches of mini-scones were prepared using leavening systems comprising sodium bicarbonate with, respectively, stoichiometric SAPP, 10% excess SAPP, 50% excess SAPP and 10% excess SAPP with calcium chloride. The pH of the scones was measured.

TABLE VIII

| SAPP | Stoichiometric | 10% excess | 50% excess | 10% excess + $CaCl_2$ |
|---|---|---|---|---|
| pH | 7.5 | 7.25 | 6.8 | 6.3 |

Thus even a 50% excess of SAPP (an unrealistically high concentration) could not reduce the pH to 6.5, at which most preservatives begin to be reasonably effective. However, in the presence of calcium chloride a pH of 6.3 was obtained using only 10% excess SAPP.

EXAMPLE 26

MSC is not an effective acidulant, when used in a stoichiometric proportion with sodium bicarbonate. Two Madeira cakes were prepared using as leavening system 7.665 g sodium bicarbonate with, respectively, stoichiometric MSC (9.768 g) and 75% stoichiometric MSC (7.335 g) plus 4.78 g $CaCl_2$.

The MSC alone did not generate sufficient $CO_2$ during the bake and the cake failed to rise. The MSC and Precipitant showed little evidence of rising during the early stages of heating but rose rapidly when the temperature passed 60° C., to give alight well leavened texture.

EXAMPLES 27-28

Four leavening systems were prepared using, respectively, MSC and citric acid with and without $CaCl_2$. The systems were tested in a Madeira cake formulation.

TABLE IX

| Ingredients: | Example 27 | Comparison | Example 28 | Comparison |
|---|---|---|---|---|
| Soda (g) | 7.665 | 7.665 | 10.541 | 10.541 |
| $CaCl_2$ (g) | 4.78 |  | 4.780 |  |
| MSC (g) | 7.335 | 9.768 |  |  |
| Citric (g) |  |  | 6.58 | 8.04 |
| Total Leavening (g) | 19.78 | 17.43 | 21.90 | 18.58 |

The bake loss, average shoulder height, middle cake height and crumb pH was determined.

TABLE X

| Leavening | Average Height in middle (mm) | Average Shoulder Height (mm) | Average Bake Loss | pH |
|---|---|---|---|---|
| MSC + CaCl$_2$ | 81.62 | 63.03 | 7.72% | 7.88 |
| MSC | 64.45 | 68.76 | 7.33% | 7.09 |
| Citric + CaCl$_2$ | 74.57 | 61.04 | 7.26% | 8.36 |
| Citric | 59.70 | 60.94 | 6.90% | 7.43 |

The trials containing CaCl$_2$ produced much better Madeira cakes compared to the trials that did not contain any precipitant. The trials using MSC as the acidulant produced better cakes than the trials that used citric acid with or without CaCl$_2$ precipitant Liquor logging was an issue for both trials using citric acid. Trials containing CaCl$_2$ had higher pH compared to trials that did not.

EXAMPLES 29-40

To illustrate the extent to which it is possible to reduce pH using a precipitant, and the extent to which it is possible to reduce the Acidulant without obtaining products with a higher pH than the control, mini scone tests were carried out with two commercial SALP products. Series A and B used SALP sold respectively under the registered trademarks "LEVEN LITE" and "BUDAL" 2308. In each case the control used a stoichiometric amount of SALP and the examples included a small excess of calcium chloride. The proportion of Acidulant was progressively reduced, until the pH of the scones matched that of the control. In addition, in series A, the effect of replacing the Precipitant with an equivalent amount of hydrochloric acid was noted. In this test 35 ml of 0.1018M hydrochloric acid solution was added. The results were as follows:

TABLE XI

| | Example | SALP reduction | SALP (g) | Soda (g) | CaCl$_2$ (g) | HCl | pH |
|---|---|---|---|---|---|---|---|
| A | Control | 0% | 0.75 | 0.75 | — | — | 7.5 |
| | 29 | 0% | 0.75 | 0.75 | 1 | — | 5.9 |
| | 30 | 10% | 0.68 | 0.75 | 1 | — | 6.3 |
| | 31 | 20% | 0.60 | 0.75 | 1 | — | 6.5 |
| | 32 | 30% | 0.53 | 0.75 | 1 | — | 6.9 |
| | 33 | 40% | 0.45 | 0.75 | 1 | — | 7.2 |
| | 34 | 50% | 0.38 | 0.75 | 1 | — | 7.4 |
| | HCl | 50% | 0.38 | 0.75 | — | 4.1 mmol | 7.2 |
| B | Control | | 0.75 | 0.75 | — | — | 7.3 |
| | 35 | 0% | 0.75 | 0.75 | 1 | — | 6.2 |
| | 36 | 10% | 0.68 | 0.75 | 1 | — | 6.6 |
| | 37 | 20% | 0.60 | 0.75 | 1 | — | 6.9 |
| | 38 | 30% | 0.53 | 0.75 | 1 | — | 7.2 |
| | 39 | 40% | 0.45 | 0.75 | 1 | — | 7.6 |
| | 40 | 50% | 0.38 | 0.75 | 1 | — | 7.9 |

In each case the examples with Precipitant gave superior leavening to the controls. The test with hydrochloric acid gave negligible leavening effect. Comparisons of reaction rates showed that the hydrochloric acid reacted rapidly with the bicarbonate on addition to dough at room temperature, the reaction being 60% complete after a few seconds. In contrast the Precipitant reacted slowly at first taking three minutes to reach about one third completion, at which point it appeared to reach an equilibrium. No further evolution of carbon dioxide was observed over the next five minutes.

EXAMPLES 41-44

Madeira cake trials were carried out comparing sodium bicarbonate with potassium bicarbonate (KBC) and MSC with citric acid.

TABLE XII

| Ingredients (g): | 41 | 42 | 43 | 44 |
|---|---|---|---|---|
| Soda | 7.7 | 10.5 | | |
| KBC | | | 9.2 | 12.7 |
| CaCl$_2$ | 4.8 | 4.8 | 4.8 | 4.8 |
| MSC | 7.3 | | 7.3 | |
| Citric | | 6.6 | | 6.6 |
| Total Leavening (g) | 19.8 | 21.9 | 21.3 | 24.0 |
| Height (middle) | 81.6 | 74.6 | 87.4 | 78.0 |

The two trials with potassium bicarbonate were each slightly better than the corresponding trials with sodium bicarbonate. The two trials with MSC were substantially better than the two with citric acid.

EXAMPLE 45

The reaction between SAPP and bicarbonate has hitherto been assumed to involve the formation of tetra sodium pyrophosphate and carbon dioxide according to the mechanism:

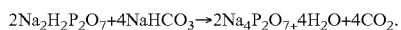

This reaction would evolve 100% of the available carbon dioxide, i.e. one mole per mole of bicarbonate. It would, however, entail a reaction between each of the available hydrogen atoms of the SAPP and a molecule of bicarbonate. The pK$_a$ for the deprotonation of the HP$_2$O$_7^{3-}$ ion is 9.3. This is too high for a reaction with a base as weak as bicarbonate to be credible.

We believe a more probable reaction would involve the formation of trisodium pyrophosphate, sodium carbonate and carbon dioxide:

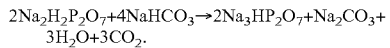

This reaction only releases three moles carbon dioxide for every four moles of bicarbonate, i.e. 75% of the available carbon dioxide. A subsequent cyclical reaction is possible, firstly between the trisodium pyrophosphate and the strongly basic sodium carbonate to form sodium bicarbonate and tetra sodium pyrophosphate followed by reaction between the bicarbonate and SAPP. This reaction would require an infinite number of cycles to release all the available carbon dioxide.

To determine which of these mechanisms corresponds most closely to reality and how the present invention affects the yields that can be obtained, we have carried out a series of tests at the either end of the critical temperature range, i.e. 70° C. and 90° C., using sodium bicarbonate, (i) alone, (ii) with calcium chloride, (iii) with an equivalent amount of SAPP (i.e. 0.5 mols per mol bicarbonate) and (iv) with an equivalent amount of SAPP and 0.06 mols calcium chloride per mol bicarbonate according to our invention. The test mixture was heated in aqueous solution for fifteen minutes and the proportion of the available carbon dioxide evolved was determined by the Chittick method. The results are set out in the following table

TABLE XIII

| Temperature | Leavening system | pH cold | % CO$_2$ liberated |
|---|---|---|---|
| 70° C. | NaHCO$_3$ | 8.3 | 24.2 |
| 70° C. | NaHCO$_3$ + CaCl$_2$ | 7.5 | 39.4 |

TABLE XIII-continued

| Temperature | Leavening system | pH cold | % CO₂ liberated |
|---|---|---|---|
| 70° C. | NaHCO₃ + SAPP | 6.7 | 66.2 |
| 70° C. | NaHCO₃ + SAPP + CaCl₂ | 6.2 | 89.3 |
| 90° C. | NaHCO₃ | 8.8 | 40.5 |
| 90° C. | NaHCO₃ + CaCl₂ | 8.1 | 62.5 |
| 90° C. | NaHCO₃ + SAPP | 8.3 | 78.1 |
| 90° C. | NaHCO₃ + SAPP + CaCl₂ | 7.7 | 97.4 |

It will be seen that the amount of carbon dioxide evolved in the reaction between SAPP and bicarbonate does not approach the 100% of theoretical, which the currently accepted theory predicts, but approximates to the 75% predicted by our proposed mechanism.

Addition of calcium chloride, according to the present invention, results in the evolution of amounts of carbon dioxide close to 100%. This supports our theory that the second hydrogen atom of the SAPP molecule is not sufficiently active to react with bicarbonate, but is activated by the addition of a Precipitant, e.g. by precipitation of calcium pyrophosphate accompanied by release of an equivalent amount of hydrochloric acid.

EXAMPLES 46-48

To determine the effect of calcium and magnesium salts in pyrophosphate-based baking powders on the pH of cakes obtained from batter, a series of batches of celebration cakes was prepared from a batter having the following composition:

TABLE XIV

| Ingredient | Weight (g) |
|---|---|
| HT flour | 250 |
| Granulated sugar | 210 |
| Xanthan gum | 0.50 |
| Skimmed milk powder | 15.0 |
| Potassium sorbate | 0.90 |
| Egg | 138 |
| Water | 96.0 |
| Glycerine | 13.5 |
| Emulsifier | 9.6 |
| Unsalted butter | 132 |
| TOTAL | 865.5 |

The following baking powder formulations were tested:
A. Control:—3.92 g soda (sodium bicarbonate), 5.37 g SAPP
B. Control+citric acid:—3.0 g soda, 4.1 g SAPP, 2.5 g citric acid
C. SAPP+calcium:—3.0 g soda, 4.8 g SAPP, 4 g CaCl₂, 1.6 g SAPP 10
D. SAPP+magnesium:—3.0 g soda, 4.8 g SAPP, 8.9 g MgSO₄.7H₂O, 1.6 g SAPP10
E. MCP+calcium:—3.0 g soda, 3.6 g CaCl₂, 3.92 g MCPa Batches of cakes were prepared using each of the above leavening systems and the heights and pH were compared as set out in the following table.

TABLE XV

| | Shoulder height (mm) | Middle height(mm) | pH |
|---|---|---|---|
| A | 36.6 | 54.5 | 7.26 |
| B | 27.4 | 38.3 | 5.81 |
| 46 | 36.0 | 53.2 | 5.84 |
| 47 | 32.2 | 57.7 | 5.93 |
| 48 | 29.8 | 42.1 | 5.6 |

The control, system (A), was a typical commercial SAPP formulation, which, when used in the normal stoichiometric proportion gives a pH far in excess of that required to allow the effective use of preservatives. For example, one of the commonest preservatives in baking, potassium sorbate, is ineffective above pH 6.5 and requires a pH of about 5.5 for optimum effectiveness.

Addition of citric acid to the control, system (B), gave a pH below 6, but at the expense of leavening, which was below commercially acceptable standards.

Addition of magnesium according to the invention (Example 45) gave a pH below 6, without significant loss of leavening, but best results were obtained using calcium according to the invention, (Example 46), which gave both a low pH and improved leavening.

MCP with calcium according to the invention (Example 47) achieved the lowest pH, very close to the optimum, but at the expense of some loss of leavening.

EXAMPLES 49 and 50

Example 1 was repeated, using for comparison two further Acidulant-free examples of the invention containing, respectively, an excess of 31% and 122% calcium chloride over the stoichiometric amount. In each case the amount of sodium bicarbonate was 5.11 g. The results are set out in Table XVI.

TABLE XVI

| Example | Calcium chloride (g) | pH | Volume (cm³) |
|---|---|---|---|
| 1 | 5.9 | 8.39 | 1152.2 |
| 49 | 4.43 | 8.45 | 1137.8 |
| 50 | 7.38 | 8.13 | 1124.5 |

All products were free from off flavours and excessive discolouration of the crumb.

EXAMPLE 51

To test the applicability of the invention in fried products, the Acidulant free leavening system of Example 1 was added to a cake donut recipe and compared with a commercial SAPP based leavening system. The control gave a product with a pH of 7.81. Despite having a pH of 8.58, the product of the invention was similar in appearance and taste to the control.

EXAMPLES 52 and 53

It was noted that in certain muffin recipes the Acidulate-free leavening system according to Example 1 of the invention gave a paler crust than usually observed with conventional acid base leavening systems and the sodium chloride formed gave the product an undesirably salty taste.

To remedy the first of these defects 10% of the sucrose in the recipe was replaced by dextrose and to avoid the salty taste the proportion of calcium chloride was reduced (example 51) and alternatively the total amount of leavening agent was reduced (Example 52). The results are set out in Table XVII with all weights in grams.

TABLE XVII

| Leavening system | Control | As Example 1 | Example 52 | Example 53 |
|---|---|---|---|---|
| Dextrose | 0 | 0 | 10 | 10 |
| Caster sugar | 195 | 195 | 185 | 185 |
| Sweetener | 150 | 150 | 150 | 150 |
| Skimmed milk powder | 12 | 12 | 12 | 12 |
| Egg | 90 | 90 | 90 | 90 |
| HT flour | 300 | 300 | 300 | 300 |
| Water | 225 | 225 | 225 | 225 |
| Sodium bicarbonate | 2.58 | 3.87 | 3.87 | 2.9 |
| SAPP | 3.53 | 0 | 0 | 0 |
| Calcium chloride | 0 | 4.43 | 3.32 | 3.32 |
| Crust | Normal | Pale | Normal | Normal |
| Taste | Normal | Salt | Normal | Normal |
| Volume | 482.4 cm$^3$ | 499.7 cm$^3$ | 466.9 cm$^3$ | 452.5 |
| pH | 7.6 | 8.4 | 8.4 | 8.3 |

EXAMPLES 54-59

The pH values typifying Acidulant-free systems of the invention do not cause problems of discolouration or flavour but may need lowering to meet the requirements of some customers. Two Acidulant free systems and four examples with Acidulant were compared in a high ratio pound cake recipe the results are given in Table XVIII. The weights of the components of the leavening system are in grams per 300 grams of flour and the volumes in cubic centimetres.

TABLE XVIII

| | Control | Example 54 | 55 | 56 | 57 | 58 | 59 |
|---|---|---|---|---|---|---|---|
| soda | 1.37 | 2.06 | 2.25 | 2.25 | 1.64 | 2.25 | 2.25 |
| SAPP | 3.53 | 0 | 0 | 0 | 0 | 0 | 0 |
| CaCl$_2$ | 0 | 2.35 | 1.77 | 1.77 | 1.02 | 2.35 | 1.77 |
| malic | 0 | 0 | 0.63 | 0 | 0 | 0 | 0 |
| GDL | 0 | 0 | 0 | 1.67 | 0 | 0 | 0 |
| MSC | 0 | 0 | 0 | 0 | 1.57 | 0 | 0 |
| Citric | 0 | 0 | 0 | 0 | 0 | 0.6 | 0 |
| Volume | 514.8 | 543.3 | 561.0 | 581.2 | 571.6 | 496.3 | 537.3 |
| pH | 7.4 | 8.4 | 8.2 | 8.1 | 7.4 | 8.6 | 8.4 |

EXAMPLES 60-62

A stoichiometric mix of calcium chloride and sodium bicarbonate as used in the examples of Wu (vs) was compared with leavening agents of the invention containing progressively increased amounts of calcium chloride relative to bicarbonate in a pound cake recipe set out in table XIX.

TABLE XIX

| | Weight (g) |
|---|---|
| Plain flour | 200 |
| Caster sugar | 200 |
| Egg | 200 |
| Shortening | 200 |
| Sodium monophosphate | 10 |
| Leavening | 6.52 |

The three examples comprised, respectively 125%, 150% and 175% of the stoichiometric ratio of calcium chloride to bicarbonate. The results are set out in the following table XX.

TABLE XX

| | Example | | | |
|---|---|---|---|---|
| | Comparative | 60 | 61 | 62 |
| % stoichiometric | 100 | 125 | 150 | 175 |
| Bicarbonate | 4.13 | 4.13 | 4.13 | 4.13 |
| Precipitant | 2.73 | 3.41 | 4.09 | 4.77 |
| Volume (cm$^3$) | 631.4 | 672.3 | 678.9 | 675.8 |
| pH | 8.7 | 8.6 | 8.4 | 8.3 |
| Colour | Dark | Pale | Pale | Very Pale |

The addition of excess Precipitant according to the invention significantly improves the leavening effect. In conventional acid/base systems excess Acidulant causes too rapid a reaction and premature loss of carbon dioxide leading to a reduction in volume.

The excess Precipitant progressively lowers the pH. This is surprising since the pH of calcium chloride in solution is 8.6.

The three examples of the invention did not exhibit the darkening effect or the bitter/soapy off flavours commonly associated with alkaline pH.

EXAMPLES 63-66

To illustrate the effect of calcium on orthophosphates, trials were conducted with the mono and di orthophosphates of sodium and potassium in a muffin recipe. All examples used 2.58 g sodium bicarbonate and 1.7 g calcium chloride per 300 g flour. The control had 2.58 g bicarbonate and 3.52 g SAPP. The results are set out in the following Table XXI, in which all weights are g per 300 g flour.

| Example | Orthophosphate | pH |
|---|---|---|
| Control | — | 7.5 |
| 63 | 5.35 g DKP | 8.9 |
| 64 | 4.36 g DSP | 8.8 |
| 65 | 2.09 g MKP | 7.6 |
| 66 | 1.84 g MSP | 7.6 |

The di alkali metal salts are alkaline in the absence of the Precipitant, and do not normally react with bicarbonate. All the examples gave superior leavening compared to the control, with similar taste and colour, despite the higher pH of examples 63 and 64. Example 65 was particularly good.

The invention claimed is:

1. A leavening agent comprising:
   (i) an alkali metal bicarbonate in an amount effective for leavening;
   (ii) an acidulant selected from phosphorous oxyacids and their mono-, di-and tri-basic salts, including SALP, SAPP, phosphoric acid, mono-and di-sodium and potassium phosphates, and mono-and di-calcium phosphate, and MSC, glucono-delta-lactone, fumaric acid, maleic acid, malic acid, succinic acid, adipie acid, tartaric acid, monosodium tartrate, citraconic acid, aconitic acid, itaconic acid, mono potassium citrate and tartrate, hydrolysed lactones and polylactic acid and sodium aluminum sulphate and mixtures thereof, said acidulant being present in an amount of 0 to 90% of a stoichiometric amount thereof required to react with the bicarbonate; and
   (iii) at least 0.1 mole per mole of bicarbonate of a precipitant;
   wherein the total amount of (ii) and (iii) are equal to from 110 to 250% of a stoichiometric amount that would be required to react fully with (i) in a boiling aqueous solution.

2. A leavening agent according to claim 1 wherein the alkali metal bicarbonate is sodium and/or potassium bicarbonate.

3. A leavening agent according to claim 1 wherein the precipitant is a salt of calcium and/or magnesium.

4. A leavening agent according to claim 1 wherein the precipitant is selected from the group consisting of salts of formic, acetic, fumaric, lactic, aconitic, itaconic, citraconic, tartaric, adipic, ascorbic, malic, lactobionic, hydrochloric and sulphuric acid, and mixtures thereof.

5. A leavening agent according to claim 1 wherein the precipitant is calcium chloride.

6. A baking powder comprising a leavening agent according to claim 1.

7. A self-raising flour comprising a leavening agent according to claim 1.

8. A bakery mix comprising a leavening agent according to claim 1.

9. A method of baking comprising: heating the bakery mix of claim 8 to form a baked confection.

10. A confection prepared by the method of claim 9.

* * * * *